US008260707B2

(12) United States Patent
Treadwell et al.

(10) Patent No.: US 8,260,707 B2
(45) Date of Patent: Sep. 4, 2012

(54) AUTOMATED TELLER MACHINE TRANSACTION QUEUE

(75) Inventors: Scott Treadwell, Addison, TX (US); Phillip DeLorenzo, Albany, NY (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 12/173,322

(22) Filed: Jul. 15, 2008

(65) Prior Publication Data

US 2010/0017327 A1     Jan. 21, 2010

(51) Int. Cl.
*G06Q 40/00* (2006.01)
(52) U.S. Cl. ............... 705/43; 705/35; 705/39; 705/42
(58) Field of Classification Search ............ 705/35, 705/39, 42, 43
See application file for complete search history.

(56) References Cited

U.S. PATENT DOCUMENTS

| 5,064,999 | A | * | 11/1991 | Okamoto et al. ............... 235/379 |
| 5,465,328 | A | * | 11/1995 | Dievendorff et al. ............ 714/15 |
| 5,937,396 | A | * | 8/1999 | Konya ............................... 705/43 |
| 6,158,655 | A | * | 12/2000 | DeVries et al. ................ 235/380 |
| 7,040,533 | B1 | | 5/2006 | Ramachandran |
| 7,549,575 | B2 | * | 6/2009 | Hansen et al. ................ 235/379 |
| 7,606,560 | B2 | | 10/2009 | Labrou et al. |
| 2002/0069170 | A1 | | 6/2002 | Rizzo et al. |
| 2004/0124966 | A1 | * | 7/2004 | Forrest ............................ 340/5.8 |
| 2004/0243515 | A1 | * | 12/2004 | Kurihara et al. ................ 705/41 |
| 2006/0068817 | A1 | * | 3/2006 | Black et al. ................... 455/466 |
| 2006/0206709 | A1 | | 9/2006 | Labrou et al. |
| 2007/0045395 | A1 | * | 3/2007 | Corona et al. ................ 235/379 |

FOREIGN PATENT DOCUMENTS

| EP | 884703 A2 * | 12/1998 |
| EP | 0884703 A3 | 7/2000 |
| JP | 2001175783 | 12/1999 |
| JP | 2005258745 | 3/2004 |

OTHER PUBLICATIONS

United States General Accounting Office, "Automated Teller Machines: Issues Related to Real-Time Fee Disclosure", Report to Congressional Committees, Jul. 2000, GAO/GGD/AIMD-00-224.
United Kingdom Patent Office, Search Report, Oct. 14, 2009, 2 pgs, United Kingdom.
David M. Grigg, et al.; U.S. Appl. No. 13/018,288, filed Jan. 31, 2011.
David M. Grigg, et al.; U.S. Appl. No. 13/018,295, filed Jan. 31, 2011.

* cited by examiner

*Primary Examiner* — William Rankins
(74) *Attorney, Agent, or Firm* — Michael A. Springs; Moore & Van Allen, PLLC; W. Kevin Ransom

(57) ABSTRACT

Methods and a system for performing an automated teller machine (ATM) transaction using a queue are disclosed. A user may first initiate an ATM transaction from a networked device to create a pending ATM transaction. The pending ATM transaction is then stored into a queue until it is accessed by the ATM. When a user is ready to complete the pending ATM transaction, the pending ATM transaction is retrieved from the queue and is completed by, for example, the ATM.

18 Claims, 3 Drawing Sheets

AUTOMATED TELLER MACHINE TRANSACTION QUEUE

BACKGROUND

Many banks employ automated teller machines (ATMs), which are machines located physically outside of a bank's financial center but are electronically connected to the bank's systems. ATMs allow a bank's customers to perform transactions outside of normal banking hours and/or outside of the bank's financial center.

In order to perform an ATM transaction, a customer must, first, physically travel to an ATM. The customer may have to wait in line if other bank customers also intend to access the ATM. To access the ATM, the customer enters his ATM card and personal identification number, and then initiates a banking transaction.

SUMMARY

Embodiments of the present invention allow a person to process an automated teller machine (ATM) transaction by initiating the ATM transaction from a networked device. The networked device may be any electronic device, such as, for example, a personal computer. By initiating the ATM transaction, the pending ATM transaction is then stored into a queue until it is accessed by an ATM. When a user is ready to complete the pending ATM transaction, the pending ATM transaction is retrieved from the queue and is completed by, for example, an ATM.

In at least one embodiment, anytime the user accesses an ATM, the ATM queue may be queried to determine if any pending ATM transactions are stored in the queue.

In some other embodiments, prior to completing the transaction, an interface may be presented for the user to confirm and perform any pending ATM transactions. This interface may be displayed in response to the ATM determining if any pending ATM transactions are stored in the queue.

A system for implementing an embodiment of the invention can include a middle ware processing system, an ATM and a network for connecting the ATM to the middle ware processing system. The processing system is provided for initiating the ATM transaction from the remotely located networked device and storing the pending ATM transaction, and an ATM is provided for executing the pending ATM transaction. These functions could be combined into one or two actual hardware platforms. Servers can be interconnected with Internet access functionality to provide a network connection to the networked device used by the customer. An embodiment of the invention can be implemented via appropriate software and/or computer program code instructions. These instructions may be in the form of a computer program product, which is installed to run on the hardware discussed above and stored on a computer-readable storage medium. The combination of hardware and software to perform the functions described can form the means to carry out the processes of the invention. The combination of hardware and software to perform the functions described can form the means to carry out the processes of the invention.

DETAILED DESCRIPTION OF THE INVENTION

Figure 1:
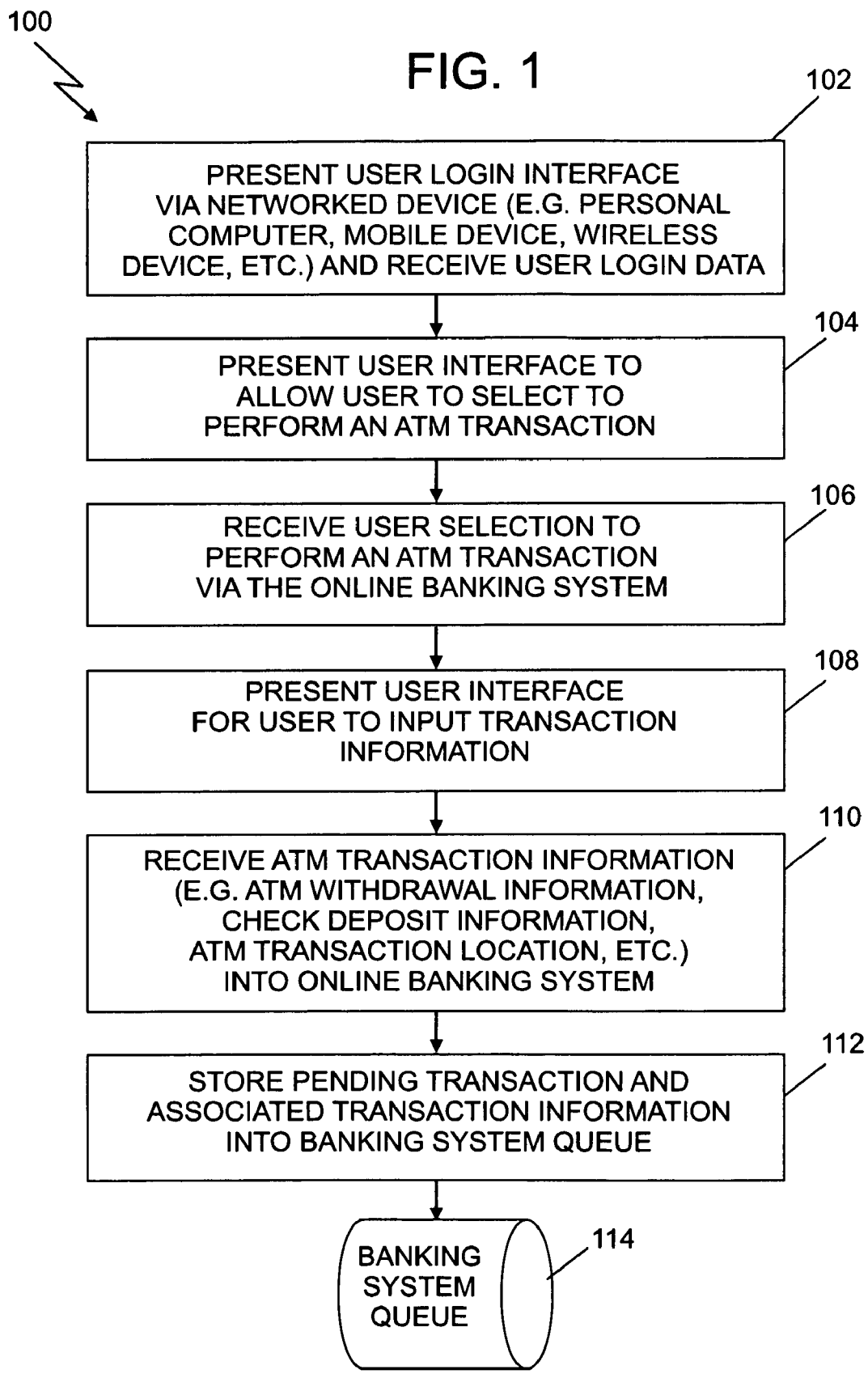
FIG. 1 is a flowchart illustrating how an embodiment of the invention interacts with an end user customer via a networked device to initiate an ATM transaction.

The following detailed description of embodiments refers to the accompanying drawings, which illustrate specific embodiments of the invention. Other embodiments having different structures and operation do not depart from the scope of the present invention.

As will be appreciated by one of skill in the art, the present invention may be embodied as a method, system, computer program product, or a combination of the foregoing. Accordingly, the present invention may take the form of an entirely hardware embodiment, an entirely software embodiment (including firmware, resident software, micro-code, etc.) or an embodiment combining software and hardware aspects that may generally be referred to herein as a "system." Furthermore, the present invention may take the form of a computer program product on a computer-usable storage medium having computer-usable program code embodied in the medium.

Any suitable computer usable or computer readable medium may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires; a tangible medium such as a portable computer diskette, a hard disk, a random access memory (RAM), a read-only memory (ROM), an erasable programmable read-only memory (EPROM or flash memory), a compact disc read-only memory (CD-ROM), or other optical or magnetic storage device; or transmission media such as those supporting the Internet or an intranet. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer usable or computer readable medium may be any medium that can contain, store, communicate, propagate, or transport the program for use by or in connection with the instruction execution system, apparatus, or device. The computer usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency (RF) or other means.

Computer program code for carrying out operations of the present invention may be written in an object oriented, scripted or unscripted programming language such as Java, Perl, Smalltalk, C++ or the like. However, the computer program code for carrying out operations of the present invention may also be written in conventional procedural programming languages, such as the "C" programming language or similar programming languages.

The present invention is described below with reference to flowchart illustrations and/or block diagrams of methods, apparatus (systems) and computer program products according to embodiments of the invention. It should be understood that each block of the flowchart illustrations and/or block diagrams, and combinations of blocks in the flowchart illustrations and/or block diagrams, can be implemented by executable computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. Alternatively, computer program implemented steps or acts may be combined with operator or human implemented steps or acts in order to carry out an embodiment of the invention.

FIG. 1 presents a flowchart illustration of a process, 100, by which a customer may initiate an ATM transaction via a networked device. Like most flowcharts, FIG. 1 illustrates process 100 as a series of process or sub-process blocks.

To initiate an ATM transaction, a networked device may connect to an online account and/or an online banking system. For purposes of an example relative to the embodiments of the invention presented herein, it can be assumed that the online account being discussed is an online banking account at a financial institution. However, it cannot be overemphasized that the invention can apply to any form of E-commerce, including stock trading, retail, on-line auctions, etc. Basically, embodiments of the invention could find use in any environment where users access an account of any kind both on-line and with ATM. Terms like "account," "online banking system," and "on-line service" are used herein in their broadest sense. Institutions, organizations, and corporations that maintain various types of accounts are widely varied in their organization and structure, as well as are the accounts themselves. These terms are intended to encompass all possibilities, including but not limited to finance companies, stock brokerages, credit card companies, and mortgage companies.

To access the online banking system, a user with an online banking account goes through an authentication and/or logon process. As illustrated in block 102, the user is presented a user login interface, which can be specifically directed at allowing the customer to employ a networked device to sign in to the online banking system. In example embodiments, the user is presented with the login interface via a Web page. The networked device may be any electronic networking device other than the ATM where the eventual ATM transaction will be completed. Examples of the network device can include a mobile computer, personal computer, mobile terminal, such as a personal digital assistant (PDA), cellular telephone, Blackberry, personal electronic device, Bluetooth capable device, flash drive, smart card, or any other device capable of transmitting and/or receiving data to/from a network. The networked device can connect with the online banking system via any type of network such as a local area network (LAN), a wide area network (WAN), a Bluetooth network, a Web page and the like. The network connection can be wireless or a wired connection.

Once the user login interface is presented to the user, the user may log on to the online banking system by inputting user login credentials into the user login interface. The user login credentials are received by the online banking system and are evaluated against an online banking credentials database. A determination is made as to whether the current user is authorized to access the online banking system based on the received user login credentials. If the user is authorized to the online banking system, then the user is allowed to access the online banking system and/or one or more online accounts and processing branches to block 104.

In block 104, while the customer is logged onto and accessing the online banking system, an interface or prompt is issued to determine whether the customer would like to initiate an ATM transaction. If not, the user may perform normal on-line banking processes or actions. If the customer desires to initiate the ATM transaction, the customer can select to perform an ATM transaction, such as by clicking a URL, selecting an option from a menu, checking a web-based checkbox, and the like. In block 106, the user selection to perform an ATM transaction is received via the online banking system.

In response to receiving user selection to perform an ATM transaction, processing flows to block 108 where an interface to input ATM transaction information is presented to the user. The ATM transaction interface can include various input sections, where the customer may enter various ATM transaction information.

The ATM transaction information can be any information related to the desired transaction, such as the type of transaction, a specific ATM location where the transaction will be completed, the amount of money involved, at least one banking account that will be used for the transaction, security rules that will be applied at the ATM to complete the transaction, and/or any other information associated with a banking transaction. The type of ATM transaction can be any transaction capable of being performed at a bank and/or bank ATM, such as money withdrawal from a customer's bank account, money or check deposit to a bank account, transferring money from one bank account to another, and the like. The ATM location where the pending ATM transaction will be eventually completed can be one specific ATM, a specific plurality of ATMs, or not limited to any specific ATM. The security rules that may be applied to the ATM in completing the transaction include any predefined rules which may be followed in order to complete the pending ATM transaction, such as defining a confirmation code for the pending ATM transaction, defining a time period to complete the pending ATM transaction, defining who is allowed to complete the pending ATM transaction and the like.

At block 110, the transaction information inputted by the user is received by the banking system. When the transaction information is inputted and/or received, the ATM transaction has been initiated. In one embodiment, the ATM transaction is initiated by completing one or more ATM transaction processing steps. For example, to initiate a money withdrawal ATM transaction, a banking system may reserve a specific amount of money until the customer completes the transaction. Once the ATM transaction has been initiated, the status of the ATM transaction remains pending until the ATM transaction is fully completed. In another embodiment, initiating the ATM transaction occurs when transaction information is inputted by the user.

At block 112, the pending ATM transaction is stored into a banking system queue 114. The pending ATM transaction can be transmitted to the queue 114 by sending customer input data and/or ATM transaction information. The pending ATM transaction can be encrypted prior to transmission.

As shown in process 100, typically, once a user has initiated one or more ATM transactions via the online banking system, processing returns to the normal on-line banking system. It should be noted that a customer may not wish to perform any on-line banking actions at this time. In such a case, the customer may simply log off the online banking system.

Figure 2:
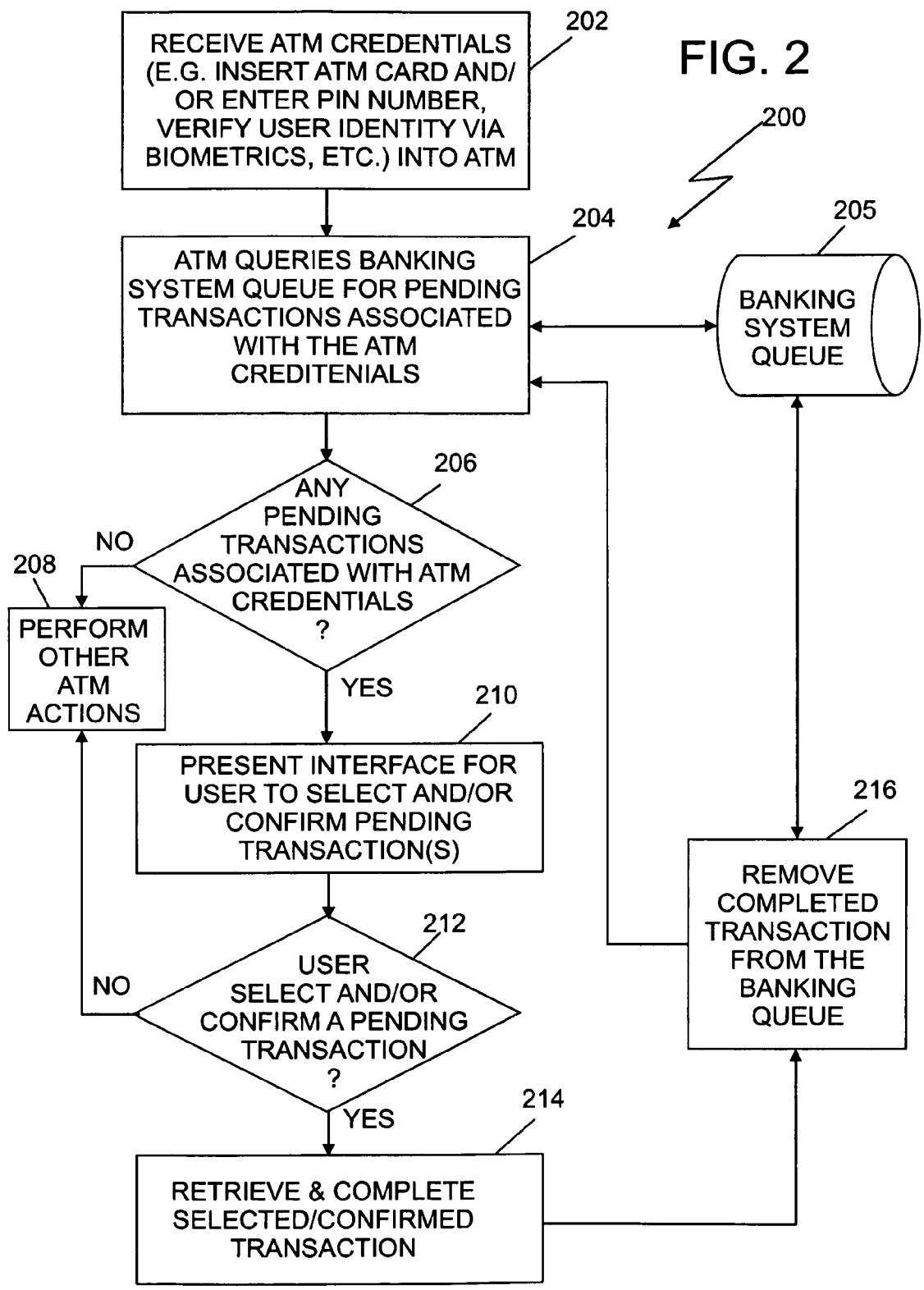
FIG. 2 is a flowchart illustrating how an embodiment of the invention interacts with an end user customer via an ATM to complete a pending ATM transaction.

FIG. 2 presents a flowchart illustration of a process, 200, by which a customer may complete a pending ATM transaction via an ATM. Similar to FIG. 1, FIG. 2 illustrates process 200 as a series of process or sub-process blocks.

After initiating the ATM transaction via the networked device, as illustrated in FIG. 1, an ATM may be employed to complete the pending ATM transaction, as shown in FIG. 2. Any ATM, or only the ATM specified in initiating the ATM transaction, may be employed. It should be understood that any device or person, including the user that initiated the transaction or any other authorized user, may access the ATM to complete the pending ATM transaction. In one embodiment, a user may physically travel to an ATM to complete the pending ATM transaction.

In block 202, a user is authenticated to an ATM in order to access the ATM. In one embodiment, the user may request access to the ATM by supplying some sort of identification means, such as using an ATM card, a key fob, a security code, proximity sensor, bioinformatics, and the like. Then, ATM login credentials may be supplied to the ATM and evaluated against an ATM credentials database. A determination is made as to whether the current user is authorized to access the ATM. If so, then the user is authenticated and the user may access the ATM and one or more banking accounts.

After a user is authenticated to the ATM, the ATM queries the banking system queue 205 as to whether any pending ATM transactions associated with the user, the user's bank account(s) and/or the identification means supplied to the ATM are stored in the queue 205. In response to this query, a determination is made as to whether any such pending transactions are stored in the queue 205, conceptually illustrated as decision block 206 of FIG. 2. If a determination is made that no pending ATM transactions is stored in the queue 205, the processing branches to block 208 where the user may perform other ATM processes.

If a determination is made that at least one pending ATM transaction is stored in the queue 205, the processing branches to block 210 where an interface is presented to the user for the user to confirm at least one of the pending ATM transactions. In the event that more than one transaction is stored in the queue 205, the interface may inquire as to which pending transactions should be performed. In response, the user may select one or more pending ATM transactions for the ATM to complete. In decision block 212, a response from the user as to whether the user has selected or confirmed a pending ATM transaction is received by the ATM. If no pending ATM transaction is selected or confirmed, the processing may branch to block 208 where the user may perform other ATM transactions.

If one or more pending ATM transactions are selected and/or confirmed to be completed, the pending ATM transaction(s) that were selected and/or confirmed by the user is retrieved from the queue 205 and completed, as shown in block 214. Then, the pending ATM transaction(s) that were retrieved and completed are removed from the banking queue, as shown in block 216. Processing may then return to block 204 to query the queue 205 for any more pending ATM transactions. This process may continue until no more pending ATM transactions are stored in the queue 205.

In one embodiment, the processing may skip blocks 210 and 212 and automatically complete one or more of the pending ATM transactions stored in the queue 205 such that no user input would be required. To set up such an automatic processing of the pending ATM transaction, the user may be able to associate such automatic processing with the pending ATM transaction prior to or during initiating the ATM transaction.

It should be understood that blocks 204-210 of process 200 may be performed at any time while the ATM is accessed. Further, the order of process 200 is not meant to be limited to the exemplary embodiments of FIGS. 1-2.

Figure 3:
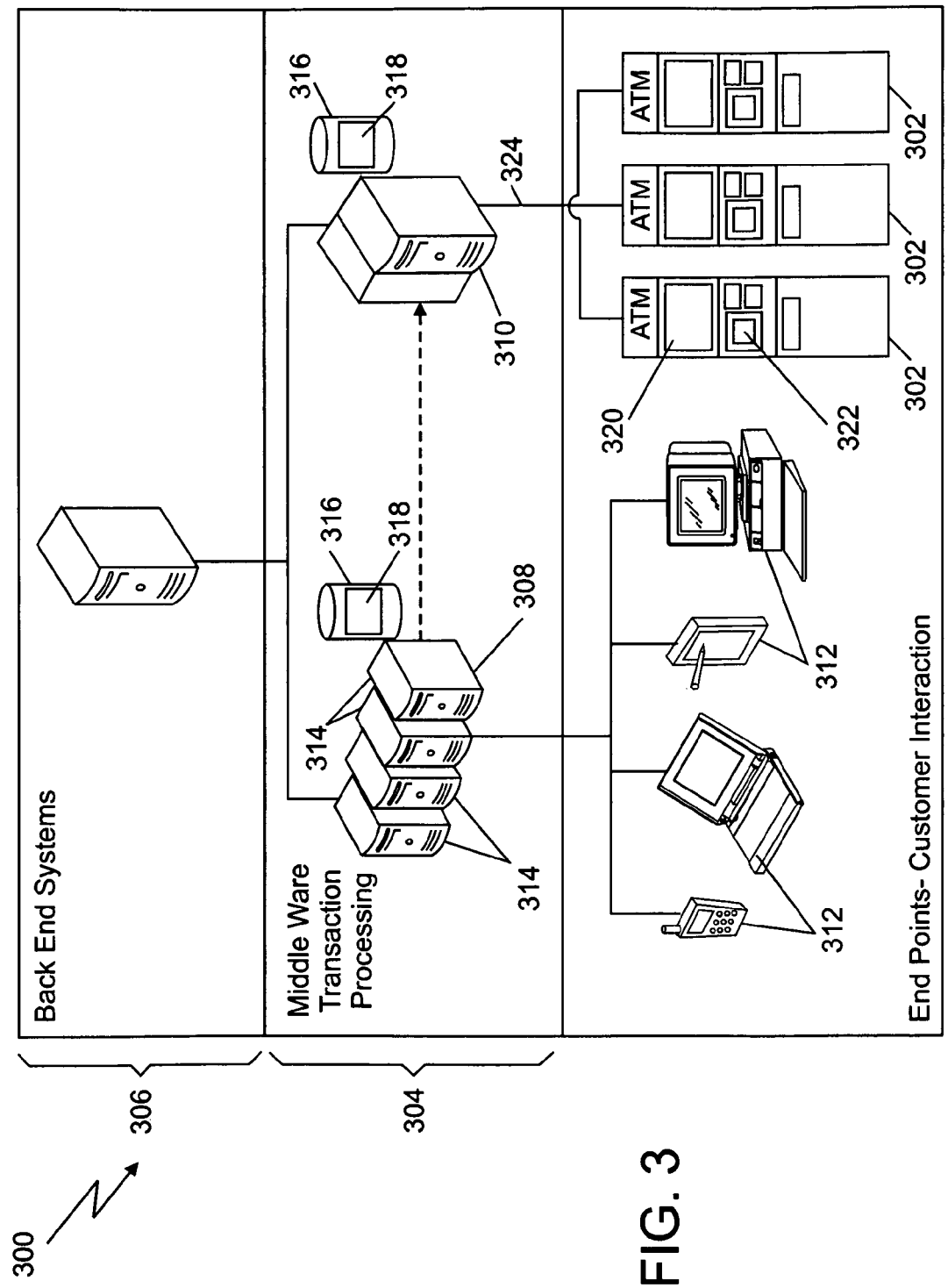
FIG. 3 is a system block diagram illustrating an exemplary hardware and operating environment for embodiments of the present invention.

Turning to FIG. 3, a network block diagram showing the systems involved in implementing an example embodiment of the invention is shown. A banking system 300 includes one or more ATMs 302 connected to a middle ware processing system 304 and a back end system 306. The online banking system 308 and the ATM processing system 310 are shown in this example as implemented on separate hardware platforms; however, they could just as easily be implemented on a single platform.

The middle ware processing system 304 includes an on-line banking system 308 and an ATM processing system 310. The networked device 312 connects to the on-line banking system 308 via the middle ware processing system 304. The on-line banking system 308 stores user login credential information, stores security preferences, and carries out the process of presenting the user interface to customers and gathering customer input. The on-line banking system 308 also gathers user login credential information from any networked or connected devices 312. The on-line banking system 308 includes on-line banking servers 314 which are connected via an Ethernet local area network (LAN).

The on-line banking system 308 may also include the banking system queue 316 where pending ATM transactions can be stored. The banking system queue 316 may be an integrated portion of any on-line banking server 314, or may be embodied in another hardware platform, such as the ATM processing system 310. As previously discussed, the on-line banking system 308 may store pending ATM transactions. Additionally, the on-line banking system 308 may store computer code instructions 318 for processing various ATM transactions that employ the banking system queue 316. As is the case with most businesses, these resources are located behind an Internet firewall (not shown).

The ATM processing system 310 is connected to one or more ATMs 302. Further, the ATM processing system stores user ATM login credential information, stores security preferences, carries out the process of presenting the user interface to ATM customers and gathering customer input, and performs various banking transactions. The ATMs 302 of FIG. 3 are represented by conceptual diagrams. Such ATMs are typically connected to peripherals such as display 320 and keyboard 322. The processing platform includes one or more processors, and a certain amount of memory. Each ATM 302 accesses the bank's servers 310 and/or 314 via a network 324, such as the Internet.

The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, action, or portion of code, which comprises one or more executable instructions or actions for implementing the specified logical function(s). It should also be noted that, in some alternative implementations, the functions noted described herein may occur out of the order presented, depending upon the functionality involved. It will also be noted that each block of the block diagrams and/or flowchart illustrations, and combinations of blocks in the block diagrams and/or flowchart illustrations, can be implemented by special purpose hardware-based systems or operators which perform the specified functions or acts.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. Additionally, comparative, quantitative terms such as "above", "below", "less", "greater", are intended to encompass the concept of equality, thus, "less" can mean not only "less" in the strictest mathematical sense, but also, "less than or equal to."

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A method of processing an automated teller machine (ATM) transaction comprising:
  receiving transaction information over a network from a user for initiating the ATM transaction from a remotely-located networked device, wherein the receiving the transaction information occurs prior to the user arriving at an ATM for completing the ATM transaction;
  creating a pending ATM transaction based at least partially on the transaction information;
  storing the pending ATM transaction into a queue, the queue being accessible by an ATM without any further communication with the networked device after the pending ATM transaction has been created, the queue being accessible upon authentication of the user at an ATM for completing the transaction;
  receiving authentication of the user at an ATM;
  querying the queue to determine if any pending ATM transactions are stored in the queue;
  prompting, at the ATM, the user to select the pending ATM transaction for completion, wherein the pending ATM transaction is presented to the user at the ATM;
  retrieving the selected pending ATM transaction from the queue for completion and
  completing the retrieved selected pending ATM transactions at the ATM.

2. The method of claim 1 wherein the networked device comprises one of a mobile terminal, a mobile computer and a personal computer and the networked device remains remotely-located from the ATM when the pending ATM transaction is retrieved at the ATM.

3. The method of claim 1 wherein the receiving transaction information comprises:
  receiving a user selection to initiate the pending ATM transaction; and
  receiving transaction information from the user regarding the pending ATM transaction, the ATM transaction comprising entering ATM information comprising a specific ATM where the pending ATM transaction will be completed.

4. The method of claim 3, wherein the transaction information received from the user comprises information related to one of a type of transaction to perform, a specific ATM location to perform the transaction, the amount of money involved, at least one banking account that will be used for the transaction, and security rules that will be applied at the ATM to complete the transaction.

5. The method of claim 4 wherein the type of transaction to perform comprises one of depositing, withdrawing, and transferring money.

6. The method of claim 1 wherein the receiving authentication of the user at the ATM comprises:
  presenting an interface for the user to enter user ATM login credentials via the ATM; and
  receiving the user ATM login credentials via the ATM.

7. The method of claim 1 further comprising removing the pending ATM transaction from the queue.

8. The method of claim 1 further comprising automatically completing the pending ATM transaction in the queue in response to determining if the pending ATM transaction is stored in the queue and in response to the user indicating to complete the pending ATM transaction so that the pending transaction is completed at the ATM without any additional interaction by the user at the ATM.

9. A computer-readable storage medium comprising computer program code embodied therein for executing an ATM transaction, the computer program code, when executed on at least one computer, allows the at least one computer to:
  receive transaction information over a network from a user for initiating the ATM transaction from a remotely located networked device, wherein the receiving the transaction information occurs prior to the user arriving at an ATM for completing the ATM transaction
  create a pending ATM transaction based at least partially on the transaction information;
  store the pending ATM transaction into a queue, the queue being accessible by an ATM without any further communication with the networked device after the pending ATM transaction has been created, the queue being accessible upon authentication of an user at an ATM for completing the transaction;
  receive authentication of the user at an ATM;
  query the queue to determine if any pending ATM transactions are stored in the queue;
  prompt, at the ATM, the user to select the pending ATM transaction for completion, wherein the pending ATM transaction is presented to the user at the ATM;
  retrieve the selected pending ATM transaction from the queue for completion; and
  complete the retrieved selected pending ATM transactions at the ATM.

10. The computer-readable storage medium of claim 9 wherein the initiating the ATM transaction from a networked device so that the ATM transaction is pending comprises:
    instructions for receiving a user's selection to perform the ATM transaction; and
    instructions for receiving ATM transaction data inputted by the user.

11. The computer-readable storage medium of claim 9 wherein the computer program code comprises instructions for removing the completed ATM transaction from the queue.

12. The computer-readable storage medium of claim 9 wherein the computer program code is stored in the queue.

13. A system for processing an ATM transaction, comprising:
    a middle ware processing system comprising:
        a processor configured to:
            receive transaction information over a network from a user to initiate the ATM transaction from a remotely located networked device, wherein the receiving the transaction information occurs prior to the user arriving at an ATM for completing the ATM transaction; and
            create a pending ATM transaction based at least partially on the transaction information;
        a queue to store the pending ATM transaction, wherein the queue is accessible by an ATM without any further communication with the networked device after the pending transaction has been created, the queue being accessible upon authentication of the user at an ATM for completing the transaction;
    an ATM configured to:
        receive authentication of the user at the ATM;
        query the queue to determine if any pending ATM transactions are stored in the queue;
        prompt the user to select the pending ATM transaction for completion, wherein the pending ATM transaction is presented to the user at the ATM;
        retrieve the selected pending ATM transactions from the queue for completion; and
        complete the selected retrieved pending ATM transaction at the ATM; and
    a network to connect the ATM to the middle ware processing system.

14. The system of claim 13, where the queue is a component of one of an ATM centralized processing system and an online banking processing system.

15. The system of claim 13, further comprising a back end system connected to the middle ware processing system via the network.

16. The system of claim 13 wherein the networked device comprises one of a mobile terminal, a mobile computer and a desktop computer.

17. The system of claim 13 wherein the mobile terminal comprises one of a personal digital assistant (PDA), a cellular telephone, and a wireless handheld device.

18. The system of claim 13 wherein the network comprises one of a local area network (LAN) connection, a wide area network (WAN) connection and a Bluetooth connection.

\* \* \* \* \*